Oct. 31, 1939.   E. UNGLAUBE ET AL   2,178,352
PROJECTION APPARATUS FOR A SMALL PLANETARIUM
Filed Dec. 20, 1937   2 Sheets-Sheet 1
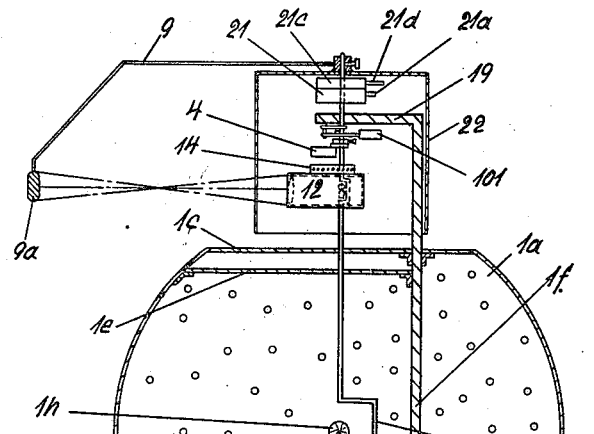
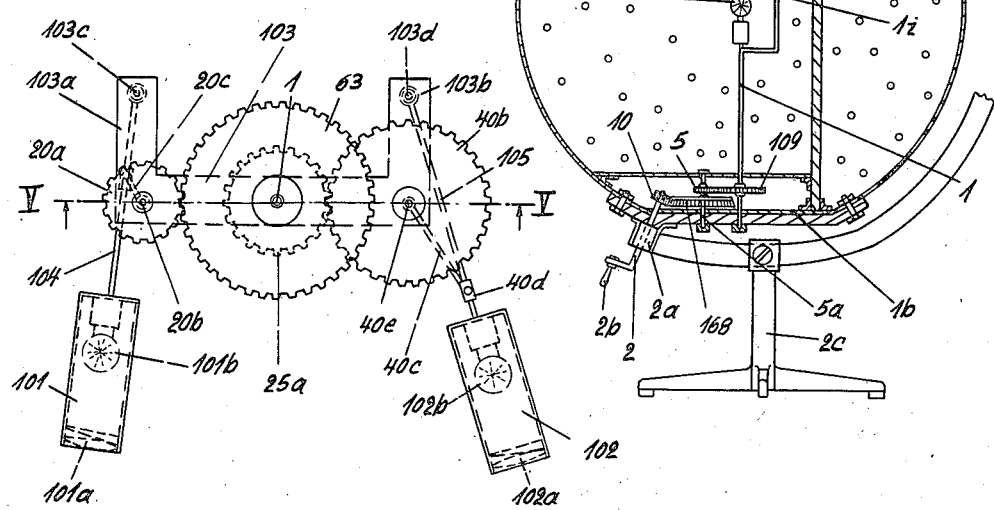
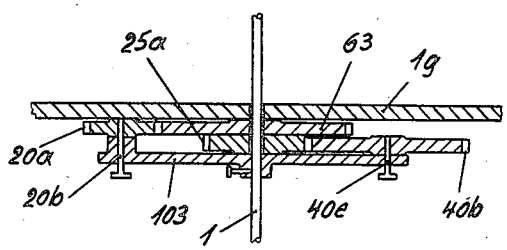

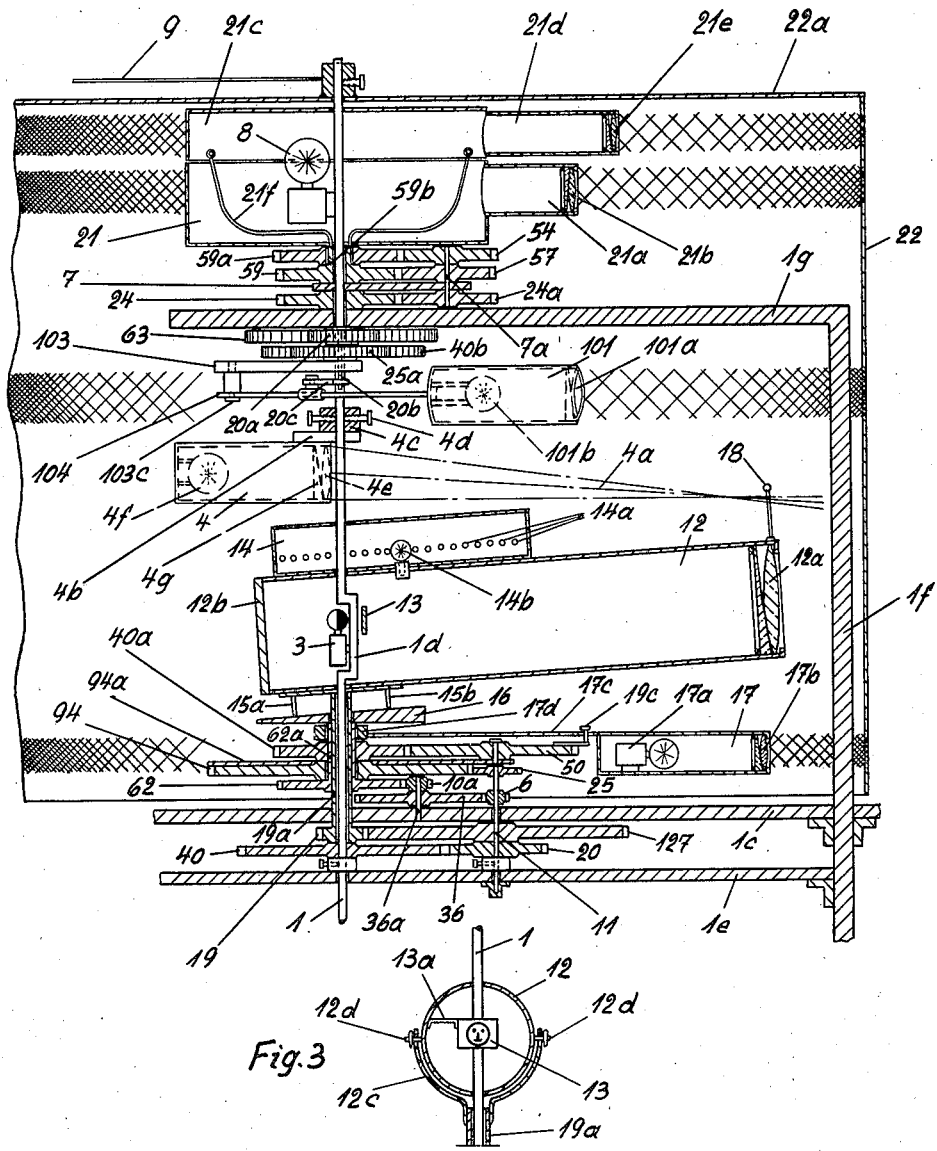

Patented Oct. 31, 1939

2,178,352

UNITED STATES PATENT OFFICE 2,178,352

PROJECTION APPARATUS FOR A SMALL PLANETARIUM

Emil Unglaube and Georg Kiehlmann, Glogau, Germany

Application December 20, 1937, Serial No. 180,797
In Germany July 9, 1937

7 Claims. (Cl. 88—24)

This invention relates to a projection apparatus for a small planetarium.

The object of the invention is to provide a universal planetarium which may be used as astronomical displaying instrument for public astronomical observatories, museums, fairs and other entertainments and as instructive teaching means for schools. With the aid of the projecting apparatus according to the invention the movement and the change of the luminous shape of the moon, of the annual circles of the sun, the eclipses and the loop course of the planets are represented.

Other tasks and tests which are connected with the construction, combination and arrangement of the individual elements will result from the following detailed description.

The invention is illustrated, by way of example, in the accompanying drawings, in which:

Fig. 1 is a total view of the projection apparatus in strongly reduced scale and partly in section.

Fig. 2 is a top plan view in section of the upper part of the projection apparatus shown in Fig. 1. The scale of Fig. 2 is greater than the scale of Fig. 1.

Fig. 3 is a cross-section through the moon-projector which forms a part of the device shown in Fig. 2.

Fig. 4 is a top plan view on the unit consisting of the Mercury-projector and of the Venus-projector which form part of the device shown in Fig. 2.

Fig. 5 is a section on line V—V of Fig. 4, the projectors proper being not shown for clearness' sake.

The projection-apparatus shown in the drawings is employed in conjunction with a spherical projection wall, and the apparatus is mounted in the centre of the projection cupola. The projection cupola is not shown as its construction and employment is known to anyone skilled in the art.

On the lower end of shaft 1, which will be hereinafter called "ecliptic shaft" a toothed wheel 109 is fixed which has a hundred and nine teeth with which a pinion 5 meshes which has five teeth. The pinion 5 is keyed on a shaft 5a which is rotatably mounted in a bottom plate 1b of a hollow sheet metal sphere flattened at the upper end and at the lower end. On the shaft 5a a toothed wheel 168 having one hundred sixty eight teeth is keyed. The ecliptic shaft 1 extends through the sheet metal sphere 1a and is rotatably mounted in the bottom plate 1b of this sphere. A bevel wheel 10 having ten teeth meshes with the toothed wheel 168 and is keyed on the end of a shaft 2. The reference numerals of the toothed wheels, pinions and bevel wheels are selected here and in the following description so that they indicate at the same time the number of teeth. The shaft 2 is rotatably mounted in a bearing 2a fixed on the bottom plate 1b of the hollow sphere 1a and equipped with a crank 2b. The bearing 2a is carried by a suitable frame. In the drawings a tripod frame 2c is shown. The longitudinal axis of shaft 2 forms an angle of 23½° with the ecliptic shaft 1. If the axle 2 is rotated, the ecliptic shaft 1 rotates in accordance with the ratio of transmission of 1 to 366.24 times as rapidly as shaft 2, this ratio being determined by the wheels 10, 168, 5 and 109. The ratio of transmission is $$\frac{168}{10} \cdot \frac{109}{5} = 366.24$$

If the hollow sphere 1a is turned, that is if the whole apparatus is turned 366.24 times, and the crank 2 with wheel 10 is held, around which wheel 168 circulates, the ecliptic shaft rotates once and in opposite direction, it carries out therefore only 365.24 rotations (366.24—1= 365.24=1 earth year). On the portion of the ecliptic shaft 1 projecting from the upper part of the sheet metal sphere 1a a ball-shaped source of light 3 is fixed, mounted in a set off portion of the ecliptic shaft so that the source of light is standing accurately in the axis of rotation of the ecliptic shaft. The half of the incandescent lamp 3 facing the ecliptic shaft is blackened, so that the light rays can radiate only towards the side which is remote from the set off portion 1d. The source of light 3 is the "moon-lamp" of the moon-projector 12.

The moon-projector consists of a tube 12 which is closed at one end by a lens with prisms 12a and at the other end by an opaque plate 12b. Within the tube 12 a glass pane 13 is fixed with the aid of a carrying arm 13a so that this glass-pane comes, relative to the moon-lamp 3, into the rays radiating from the same when tube 12 is in according position. The "face", that is the spot-picture of the moon, is painted on pane 13 as really seen from the earth. The tube 12 is arranged so that it can loosely rotate on the ecliptic shaft 1 and so that the angle which the longitudinal axis of tube 12 forms with shaft 1 can change from 85 to 95°. The tube 12 is mounted in a fork 12c by means of two lateral pins 12d so that it can swing around a transverse axis, the fork being near the one end of tube 12. The fork 12c is fixed on the upper end of a sleeve 19a enclosing loosely rotatable the ecliptic shaft 1, and one end of the same carries a toothed wheel 19. Two pins 15a and 15b are fixed on the lower end of the tube 12 and support said tube 12 upon a plate 16. This plate has a bore through which the sleeve-like hub 19a of the toothed wheel 19 freely extends. The plate 16 is constructed and fixed on the upper end of the sleeve-like hub of a toothed wheel 62 so that the surface of plate 16 forms an angle of 85° with the axis of rotation of the ecliptic shaft. If the ecliptic shaft 1 is standing vertical, the upper side of plate 16 forms with the horizontal plane an angle of 5° (measured in downward direction), this angle corresponding to the inclination of the lunar orbit relative to the ecliptic. A box 14 is mounted on the upper side of tube 12, the wall of said box having a row 14a of holes. A source of light 14b is arranged in the middle of box 14 so that the rays from this source of light can pass through the holes of the row 14a towards the outer side.

The toothed wheel 19, on the hollow hub 19a of which the carrying fork 12c of the moon-projector 12 is fixed, is mounted between the cover plate 1c of the sheet metal sphere 1a and an intermediate plate 1e which is rigidly connected with the top plate by a vertical bar 1f. Also the other wheels of the gear are mounted between the plates 1c and 1e, said gear transmitting the rotation of the ecliptic shaft 1 upon the toothed wheel 19. The gear consists of a toothed wheel 40 keyed on shaft 1 and of toothed wheels 20 and 127 keyed the one above the other on an intermediate shaft 11. The toothed wheel 20 meshes with the toothed wheel 40, whereas the toothed wheel 127 meshes with the toothed wheel 19. The ratio of transmission between the ecliptic shaft and the toothed wheel amounts therefore to $$\frac{40}{20} \cdot \frac{127}{19} = 13.3684$$

Therefore, if the ecliptic shaft has carried out a complete rotation, the toothed wheel 19 and the moon-projector connected with the same have carried out 13.3684 rotations about shaft 1. This number of rotations corresponds accurately to the number of the moon circulations during an earth year.

To disc 16 another movement than that of the moon-projector 12 is imparted with the aid of a gear consisting of the toothed wheels 62, 10a, 36, 6, 20 and 40. The pinion 10a meshing with the toothed wheel 62 is keyed on the shaft 36a of toothed wheel 36, said shaft being journalled in the top plate 1c of the sheet metal sphere 1a. The toothed wheel 36 meshes with the teeth of pinion 6, which is keyed on the above mentioned intermediate shaft 11 which is rotatably mounted in the plates 1c and 1e. The toothed wheel 20 already mentioned, keyed on this intermediate shaft, meshes with the teeth of the toothed wheel 40 keyed on shaft 1. The plate 16, which determines the inclination of the moon-projector 12 relative to shaft 1, is therefore turned in accordance with the ratio of transmission of the above mentioned gear $$\left(\frac{40}{20} \cdot \frac{6}{30} \cdot \frac{10}{62} = 0.0537\right)$$

so that the plate 16 during a complete rotation of the ecliptic shaft 1 carries out only 0.0537 rotation. The plate 16 consequently stands almost still during a complete rotation of the ecliptic shaft 1. 18.6 rotations of shaft 1 are required to once rotate the plate around the ecliptic shaft. This illustrates, how the points of intersection of ecliptic and lunar orbit wander, owing to the shifting of the latter in 18.6 years round through the ecliptic.

For illustration of the eclipse of the sun a diaphragm 18 is fixed on the tube 12 of the moon-projector and gets into the path of rays 4a of the sun-projector 4 at the two points in which the moon course is in the height of the ecliptic.

The sun-projector 4 consists of a tube which is open only at one end and carries on this end an arm 4b. This arm 4b is mounted on the one side of a sleeve 4c through which the ecliptic shaft 1 extends. The sleeve 4c is rigidly connected with the ecliptic shaft 1 by means of clamping screws 4d. The open end of the sun-projecor has a lens 4e and a prism 4g, opposite which a spherical source of light 4f is arranged (the sun-lamp). The arrangement is therefore such that the light rays radiating from the sun-projector pass at the side of the ecliptic shaft 1. The sun-projector turns, together with the ecliptic shaft 1, that is carries out an "annual" movement.

A circular disc 9a serves for representing the lunar eclipse and is fixed on a wire 9 so that it can get into the path of rays of the moon-projector 12. The wire 9 is fixed on the ecliptic shaft 1 and therefore participates in the (annual) movement of the same. The circular disc 9a corresponds to the cross-section of the earth shadow and prevents in its effective position, that the light rays of the lunar-projector impinge onto the projection wall.

Beneath the moon-projector the Mars-projector 17 is arranged which consists of a tube 17, a source of light 17a and an optic system 17b, the latter being composed of a lens and of a prism. The tube 17 is fixed on a rod 17c so that it forms the extension of this rod. The rod 17c is mounted, with the aid of a sleeve 17d, freely rotatable on the hollow hub 62a of the toothed wheel 62 so that the Mars-projector 17 can turn around the ecliptic shaft 1. The Mars-projector is driven from the already mentioned intermediate shaft 11 which, with this object in view, is equipped with a toothed wheel 25. This toothed wheel is in mesh with a toothed wheel 94 which is mounted on the hollow hub 62a of the toothed wheel 62 so that it can loosely rotate on this hollow hub. A bar 94a is fixed on the toothed wheel 94 so that its end projects beyond the circumference of wheel 94. In this projecting portion of bar 94a the pivot axle of a toothed wheel 50 is journaled which meshes with the toothed wheel 40a. The latter toothed wheel is keyed on the hub 62a of the toothed wheel 62 and therefore rotates very slowly, together with the carrying plate 16 of the moon-projector 12. The wheel 50 has an eccentric pin 19c engaging in a longitudinal slit of rod 17c.

The toothed wheel 94 is driven from the ecliptic shaft 1 at a ratio of transmission of $$1 : 0.532 \left(\frac{40}{20} \cdot \frac{25}{94} = 0.532\right)$$

The Mars-projector turns therefore approximately half as rapidly as the ecliptic shaft 1. This lagging behind of the movement of the Mars-wheel 94 relative to the rotation of the ecliptic shaft 1 has the result, that the toothed wheel 50 rolls on the toothed wheel 40a, the latter, as mentioned above, turning accurately as slowly as plate 16, that is being practically almost at standstill during one rotation of the ecliptic shaft. Consequently, a reciprocating movement corresponding to the geocentric movement of the planet Mars is communicated to the Mars projector 17 with the aid of the eccentric gear 19c at every complete rotation of the ecliptic shaft 1.

The Mercury-projector 101 and the Venus-projector 102 are arranged above the Sun-projector 4. Each projector consists of a tube 101, respectively 102 with an optical system 101a, 102a respectively, composed of lens and prism and with an incandescent lamp 101b, 102b respectively. On the ecliptic shaft a transverse head 103 is fixed, at the ends of which arms 103a, 103b respectively, each at the same distance from the ecliptic shaft 1, are arranged. On the lower side of each arm a pin 103c, 103d respectively is fixed, and on each of these pins the end of a rod 104, 105 respectively is turnably mounted. The rod 104 carries the Mercury-projector 101, whereas the rod 105 carries the Venus-projector 102. Both projectors extend in the prolongation of the corresponding carrying rod. A toothed wheel 20a is arranged on the transverse head 103, the axle 20b of this toothed wheel being journaled in a bore extending through the point of intersection of the central longitudinal axis of the transverse head 103 with the central longitudinal axis of the arm 103a. The lower end of the shaft 20b projecting from the lower side of the transverse head carries an arm 20c, the free end of which carries a bearing enclosing the rod 104. The toothed wheel 20a meshes with a toothed wheel 63 which is arranged on the ecliptic shaft 1, but not keyed on the same, but fixed on a bar 1g. This bar forms part of the supporting frame consisting of the above mentioned plates 1b, 1c, 1e, 1f.

The rod 105 of the Venus-projector extends through a bearing 40d, which is arranged on the end of an arm 40c. This arm is fixed on the shaft 40e which is rotatably mounted so that it can turn in a bore of the transverse head 103 and is connected with a toothed wheel 40b at its upper end projecting over the transverse head. The axis of rotation of the shaft 40e is in the point of intersection of the central longitudinal axis of the transverse head 103 with the central longitudinal axis of the arm 103b. The toothed wheel 40b meshes with the toothed wheel 25a, which is keyed on the lower side of the toothed wheel 63 and has a central bore through which the ecliptic shaft 1 extends. The toothed wheels 25a and 63 are therefore stationary and do not participate in the rotation of the ecliptic shaft 1.

The rotation of the ecliptic shaft 1 is transmitted with the aid of the transverse head 103, the arms 103a and 103b and the rods 104, 105, upon the two projectors for Mercury and Venus, so that both projectors participate in the "annual" movement of the ecliptic shaft 1. To every projector, however, an additional oscillating movement around the pins 103c, 103d respectively is imparted, and this movement is produced by the rolling of the toothed wheels 20a and 40b on the stationary toothed wheels 63 and 25a.

At every complete rotation of the ecliptic shaft 1 the toothed wheel 20a rotates 3.15 times around itself, as it is moved by the transverse head 103 once around the stationary toothed wheel $$63\left(\frac{63}{20}=3.15\right)$$

This self-rotation of the toothed wheel 20a has the result, that the Mercury-projector 101 during a complete rotation of the ecliptic shaft is oscillated 3.15 times to and fro around the pin 103c. The same has to be said for the Venus-projector which according to the ratio of transmission of the toothed wheels 25a and 40b $$\left(\frac{25}{40}=0.625\right)$$

oscillates to and fro, around the pin 103d, 0.625 time during a complete rotation of the ecliptic shaft.

On the upper side of the bar 1g a toothed wheel 24 is fixed, through the central bore of which the ecliptic shaft 1 extends. Above this stationary toothed wheel 24 an arm 7 rigidly connected with the ecliptic shaft 1 is arranged, the end of which, projecting beyond the circumference of the toothed wheel 24 carries an auxiliary shaft 7a. On this auxiliary shaft, which extends through the arm 7, three toothed wheels are keyed, of which the one, 24a, is arranged below arm 7 and meshes with the stationary toothed wheel 24. The two toothed wheels 57 and 54 arranged above the arm 7 and keyed on the shaft 7a are rigidly connected the one with the other. The toothed wheel 54 meshes with a toothed wheel 59a which is mounted on the ecliptic shaft so that it can loosely rotate around this shaft. The hollow hub 59b of the toothed wheel 59 extends through a corresponding central bore of the toothed wheel 59a. A hollow cylinder 21 is fixed on the toothed wheel 59a and has an aperture in its wall. From this aperture extends a tube 21a, in the open right hand end of which an optical system 21b is mounted which is composed of a lens and of a prism; this device forms the Jupiter-projector. The hollow cylinder 21 is closed at its lower end, whereas its upper end is open. In upward direction follows on the hollow cylinder 21 a hollow cylinder 21c, the lower side of which is open, whereas its upper side has a cover, that is is closed. The hollow cylinder 21c carries the Saturn-projector which consists of a tube 21d with an optical system 21e. The hollow cylinder 21d is mounted on the ends of a fork 21f fixed on the upper end of the hollow hub 59b of the toothed wheel 59. The toothed wheel 59a is mounted loosely rotatably on the hollow hub 59b of the toothed wheel 59 and carries the cylinder 21. In the chamber formed by the hollow cylinders 21 and 21c an incandescent lamp 8 is located which is fixed on one side of the ecliptic shaft 1 so that its light rays can project as well through the Jupiter-projector as through the Saturn-projector. The lamp 8 participates in the "annual" movement of the ecliptic shaft 1. The same is valid for the arm 7 which rotates the auxiliary shaft 7a with the toothed wheels 24a, 57 and 54 fixed thereon. As, however, the toothed wheel 24a meshes with the toothed wheel 24 which is stationary, that is, does not participate in the rotation of the ecliptic shaft 1, a common self-rotation is imparted to the toothed wheels 24a, 57 and 54 which almost completely holds back the counter wheels 59 and 59a. Herefrom results that during a complete rotation of the ecliptic shaft 1 the wheel 59 rotates only by $$\frac{2}{59}$$

and the wheel 59a only by $$\frac{5}{59}$$

of its circumference. The rotary movement of the intermediate shaft 7a therefore annuls for the greatest part the "annual" movement of the toothed wheels 59 and 59a so that the Jove-projector and the Saturn-projector move only very little during one complete rotation of the ecliptic shaft 1. The two projectors are now outrun by the source of light 8 "annually" on a narrower circle. Consequently, the planets-picture formed by the projectors 21b and 21d on the projection-cupola oscillates back parallactically. The planets-picture alters, owing to the slightly differentiating distance of lamp and lens, slightly as regards its size so that, besides the retrograde movement also the apparent alteration of size of the planets Jove and Saturn is shown.

In order to represent further for all five planets also the alteration of brightness which is produced by the annual course of the sun, a hollow cylinder 22 of transparent material is fixed, with the aid of the transverse head 22a, on the ecliptic shaft 1 so that it encloses all projectors. By blackening the transparent cylinder 22 within the area of the rays from the individual projectors it is possible to accordingly screen off the planets-pictures.

The sheet metal sphere 1a is perforated, so that the rays of the incandescent lamp 1h arranged in the middle of the sheet metal sphere passing through these holes, draw upon the not shown projection cupola the picture of the starry sky in the form of light spots. The lamp 1h is arranged in a set off part 1i of shaft 1 so that it is in the central longitudinal axis of the ecliptic shaft 1.

We claim:

1. A projection apparatus for a small planetarium comprising in combination a hollow spherical body perforated to simulate the position of the fixed stars, a main shaft extending through the centre of said spherical body, a stand rotatably supporting said spherical body at a point eccentric to said main shaft, a short shaft extending through the point of support into said spherical body at an angle to said main shaft, means for turning said short shaft to rotate said spherical body, a reduction gear between said short shaft and the lower end of said main shaft to rotate said shaft at a lower speed than said spherical body, a source of light on said main shaft in the centre of said main shaft projecting its rays through the perforations in said spherical body, a plurality of projectors, each presenting a celestial body movably mounted on the upper end of said main shaft, one above the other, gears connecting each of said projectors to said main shaft to impart different movements to said projectors during the rotation of said main shaft, a source of light in each of said projectors, and a frame extending through and carrying said spherical body and said gears and supporting said main shaft at its top and bottom ends.

2. A projection apparatus for a small planetarium, comprising in combination a hollow spherical body perforated to simulate the position of the fixed stars, a main shaft extending through the centre of said spherical body, a stand rotatably supporting said spherical body at a point eccentric to said main shaft, a short shaft extending through the point of support into said spherical body at an angle to said main shaft, means for turning said short shaft to rotate said spherical body, a reduction gear between said short shaft and the lower end of said main shaft to rotate said shaft at a lower speed than said spherical body, a source of light on said main shaft in the centre of said main shaft projecting its rays through the perforations in said spherical body, a plurality of projectors each representing a celestial body movably mounted on the upper end of said main shaft, one above the other, gears connecting each of said projectors to said main shaft to impart different movements to said projectors during the rotation of said main shaft, a source of light in each of said projectors, one of said projectors representing the moon comprising a sleeve rotatable on said main shaft, a pair of arms projecting from said sleeve, a projector tube oscillatably carried by said sleeve and having diametrically opposite bores for the free passage of said main shaft, a lens at the front end of said tube, the source of light in the projector arranged towards the rear end of the tube and rigidly mounted on and rotatable with said main shaft and comprising a bulb blackened on one side to intermittently project its rays through said lens, the gear of this projector comprising a plurality of gear wheels, a wedge-shaped disc rigidly mounted on one of said gear wheels concentric with said main shaft, and pins projecting downwards from the under side of said tube and bearing against said disc to vary the inclination of said tube during the rotation of said shaft and said gears.

3. A projection apparatus for a small planetarium, comprising in combination a hollow spherical body perforated to simulate the position of the fixed stars, a main shaft extending through the centre of said spherical body, a stand rotatably supporting said spherical body at a point eccentric to said main shaft, a short shaft extending through the point of support into said spherical body at an angle to said main shaft, means for turning said short shaft to rotate said spherical body, a reduction gear between said short shaft and the lower end of said main shaft to rotate said shaft at a lower speed than said spherical body, a source of light on said main shaft in the centre of said main shaft projecting its rays through the perforations in said spherical body, a plurality of projectors each representing a celestial body movably mounted on the upper end of said main shaft, one above the other, gears connecting each of said projectors to said main shaft to impart different movements to said projectors during the rotation of said main shaft, a source of light in each of said projectors, one of said projectors representing the moon, comprising a bracket loosely mounted on said main shaft, a projector tube closed at its rear end and oscillatably mounted on said bracket tube, means for oscillating said tube during the rotation of said main shaft, a lens on the front end of said tube, the source of light of the projector rigidly mounted on said main shaft towards the rear end of said tube, and a pane of glass arranged in said tube between said lens and said source of light and carrying a transparent picture corresponding to the spot picture of the moon.

4. A projection apparatus for a small planetarium, comprising in combination a hollow spherical body perforated to simulate the position of the fixed stars, a main shaft extending through the centre of said spherical body, a stand rotatably supporting said spherical body at a point eccentric to said main shaft, a short shaft extending through the point of support into said spherical body at an angle to said main shaft, means for turning said short shaft to rotate said spherical body, a reduction gear between said short shaft and the lower end of said main shaft to rotate said shaft at a lower speed than said spherical body, a source of light on said main shaft in the centre of said main shaft projecting its rays through the perforations in said spherical body, a plurality of projectors each representing a celestial body movably mounted on the upper end of said main shaft, one above the other, gears connecting each of said projectors to said main shaft to impart different movements to said projectors during the rotation of said main shaft, a source of light in each of said projectors, one of said projectors representing the sun comprising a tube closed at its rear end and mounted at its front end on the main shaft, an optical system at the front end of said tube, a source of light at the rear end of said tube projecting a beam of light through said optical system, and a screen on one of the other projectors adapted to be brought intermittently into the beam of light projected through said optical system.

5. A projection apparatus for a small planetarium, comprising in combination a hollow spherical body perforated to simulate the position of the fixed stars, a main shaft extending through the centre of said spherical body, a stand rotatably supporting said spherical body at a point eccentric to said main shaft, a short shaft extending through the point of support into said spherical body at an angle to said main shaft, means for turning said short shaft to rotate said spherical body, a reduction gear between said short shaft and the lower end of said main shaft to rotate said shaft at a lower speed than said spherical body, a source of light on said main shaft in the centre of said main shaft projecting its rays through the perforations in said spherical body, a plurality of projectors each representing a celestial body movably mounted on the upper end of said main shaft, one above the other, gears connecting each of said projectors to said main shaft to impart different movements to said projectors during the rotation of said main shaft, a source of light in each of said projectors, three of said projectors representing the Mars, Mercury and Venus respectively and each comprising a projector tube closed at one end, a lens at the other end of said tube, and an incandescent lamp in said tube and projecting a beam of light through said lens, circulating gears, one connecting each of said projectors to the main shaft, and rod systems one connected to the tube of each projector to impart a retrograde motion to said projectors during their circulating movement.

6. A projection apparatus for a small planetarium, comprising in combination a hollow spherical body perforated to simulate the position of the fixed stars, a main shaft extending through the centre of said spherical body, a stand rotatably supporting said spherical body at a point eccentric to said main shaft, a short shaft extending through the point of support into said spherical body at an angle to said main shaft, means for turning said short shaft to rotate said spherical body, a reduction gear between said short shaft and the lower end of said main shaft to rotate said shaft at a lower speed than said spherical body, a source of light on said main shaft in the centre of said main shaft projecting its rays through the perforations in said spherical body, a plurality of projectors each representing a celestial body movably mounted on the upper end of said main shaft, one above the other, gears connecting each of said projectors to said main shaft to impart different movements to said projectors during the rotation of said main shaft, a source of light in each of said projectors, two of said projectors representing Jupiter and Saturn comprising a common casing freely rotatable about the main shaft and divided in horizontal direction into two halves, two parallel tubes one projecting from each half of said casing, two lenses one at the outer end of each of said tubes, a common incandescent lamp fixed on said main shaft in said casing and projecting a beam of light through both of said tubes, and a circulating gear connecting both of said casing halves to said main shaft to rotate said halves about said main shaft at different speeds.

7. A projection apparatus for a small planetarium, comprising in combination a hollow spherical body perforated to simulate the position of the fixed stars, a main shaft extending through the centre of said spherical body, a stand rotatably supporting said spherical body at a point eccentric to said main shaft, a short shaft extending through the point of support into said spherical body at an angle to said main shaft, means for turning said short shaft to rotate said spherical body, a reduction gear between said short shaft and the lower end of said main shaft to rotate said shaft at a lower speed than said spherical body, a source of light on said main shaft in the centre of said main shaft projecting its rays through the perforations in said spherical body, a plurality of projectors each representing a celestial body movably mounted on the upper end of said main shaft, one above the other, gears connecting each of said projectors to said main shaft to impart different movements to said projectors during the rotation of said main shaft, a source of light in each of said projectors, a cylinder of transparent material fixed on the upper end of the main shaft and extending around the projectors, said cylinder having a plurality of circular stripes blackened at different intensities, and each stripe arranged within the range of projection of one of said projectors.

EMIL UNGLAUBE.
GEORG KIEHLMANN.